United States Patent
Gokhale (10) Patent No.: US 9,479,396 B2
(45) Date of Patent: Oct. 25, 2016

(54) XML BASED GENERIC UNIX DISCOVERY FRAMEWORK

(71) Applicant: SunGard Availability Services, LP, Wayne, PA (US)

(72) Inventor: Amol P. Gokhale, Pune (IN)

(73) Assignee: Sungard Availability Services, LP, Wayne, PA (US)

( * ) Notice: Subject to any disclaimer, the term of this patent is extended or adjusted under 35 U.S.C. 154(b) by 257 days.

(21) Appl. No.: 13/906,983

(22) Filed: May 31, 2013

(65) Prior Publication Data

US 2014/0359108 A1    Dec. 4, 2014

(51) Int. Cl.
   *H04L 12/24*    (2006.01)
(52) U.S. Cl.
   CPC .................. *H04L 41/0856* (2013.01)
(58) Field of Classification Search
   CPC ........... G06F 9/44505; G06F 11/1448; H04L 41/0856
   See application file for complete search history.

(56) References Cited

U.S. PATENT DOCUMENTS

| | | | |
|---|---|---|---|
| 6,182,136 B1 | 1/2001 | Ramanathan et al. | |
| 6,944,793 B1* | 9/2005 | Parker ................. | G06F 11/3006 702/188 |
| 7,251,688 B2 | 7/2007 | Leighton et al. | |
| 7,657,545 B2 | 2/2010 | Bird | |
| 8,037,289 B1* | 10/2011 | Karnik et al. ..................... | 713/1 |
| 8,990,904 B2* | 3/2015 | Branch ................... | H04L 41/28 705/347 |
| 9,304,873 B2* | 4/2016 | McElhoe ............ | G06F 11/1484 |
| 2002/0107907 A1* | 8/2002 | Case ..................... | H04L 63/083 709/203 |
| 2008/0209031 A1* | 8/2008 | Zhu et al. ...................... | 709/224 |
| 2009/0307236 A1* | 12/2009 | Kramer et al. ............... | 707/100 |
| 2011/0126197 A1 | 5/2011 | Larsen et al. | |
| 2013/0036212 A1* | 2/2013 | Jibbe ................... | H04L 67/1095 709/223 |
| 2013/0091334 A1* | 4/2013 | Yu ....................... | G06F 11/1458 711/162 |
| 2013/0254520 A1* | 9/2013 | Birnkrant et al. ................ | 713/2 |
| 2014/0007203 A1* | 1/2014 | Branch ................... | H04L 41/28 726/5 |

OTHER PUBLICATIONS www.oval.mitre.org—"Oval Frequently Asked Questions", 16 pages, retrieved from Internet Dec. 6, 2011.
www.msdn.microsoft.com "Windows Management Instrumentation" 4 pages, retrieved from Internet Dec. 2, 2011.
Datasheet for IBM SmartCloud Provisioning, IBM Software Cloud Computing, IBM Corporation, Jan. 2013, 4 pages.

* cited by examiner

*Primary Examiner* — Vivek Srivastava
*Assistant Examiner* — Muhammad Raza
(74) *Attorney, Agent, or Firm* — Cesari and McKenna, LLP (57) ABSTRACT

Services that support recovery of a data center require collecting information concerning the service customer's physical and virtual infrastructure, and specifically the configuration of their operating systems such as UNIX operating systems. Here an automatic discovery tool executes within the context of a secure browser program. Once a user is authenticated, a JavaScript or HTML program seamlessly retrieves a file that is specific to the type and version of the UNIX operating system on the host; the file contains commands and parsing logic for the commands to retrieve configuration data. Once parsed, the program forwards that data to a database so that the replication service provider may then correctly provision recovery systems.

17 Claims, 4 Drawing Sheets

```
<Type="Linux" Version="Fedora 12">
    <DataGroup name="Processor">
        <Datapoint>
            <Command command="cat /prox/cpuinfo" />
            <Parser delim=":" token="2" />
        </Datapoint>
        <Datapoint>
            <Command command="rpm -fq" seq="1"/>
            <Parser delim="\n" seq="1" />
            <Command command="rpm -f %%seq=1%%" seq="2" />
            <Parser delim=":" token="3" seq="2" />
        </Datapoint>
    </DataGroup>
</Type>
```

FIG. 4

XML BASED GENERIC UNIX DISCOVERY FRAMEWORK

CROSS REFERENCE TO RELATED APPLICATION(S)

This application is related to a co-pending U.S. patent application entitled "BROWSER BASED RECOVERY DISCOVERY" filed Mar. 16, 2012 and given Ser. No. 13/422,084, the contents of which are hereby incorporated by reference in their entirety.

BACKGROUND OF THE INVENTION

Replication of data processing systems to maintain operational continuity is now required almost everywhere. The costs incurred during downtime when information technology equipment and services are not available can be significant, and sometimes even cause an enterprise to halt operations completely. Replication may be used for many purposes such as assuring data availability upon equipment failure, site disaster recovery or planned maintenance operations.

Replication may be directed to either the physical or virtual processing environment and/or different abstraction levels. For example, one may undertake to replicate each physical machine exactly as it exists at a given time. However, replication processes may also be architected along virtual data processing lines, with corresponding virtual replication processes, with the end result being to remove the physical boundaries and limitations associated with particular physical machines.

Use of a replication service as provided by a remote or hosted external service provider can have numerous advantages. Replication services can provide continuous availability and failover capabilities that are more cost effective than an approach which has the data center operator owning, operating and maintaining a complete suite of duplicate machines at its own data center. With such replication services, physical or virtual machine infrastructure is replicated at a remote and secure data center.

A database file is typically developed with an entry for the critical data processor in the production environment. The database file may contain configuration information so that in the event of a disaster, replica(s) of the customer's production environment can be brought live at the remote and secure data center. Applications and data can then be accessed on the remote data center, enabling the service customer to continue operating from the "cloud" while recovering from a disaster. From the perspective of the service customer, the replication service provider thus offers a Recover to Cloud (R2C) service that is provided as an on-demand utility (much like the electricity grid) over a network (typically the Internet). This enables a data center operator to replicate critical servers and applications in his production environment to the cloud.

SUMMARY

Problem Statement

Thus there is a need to discover aspects of the configuration of various infrastructure elements in a customer's production environment in order to support disaster recovery. The infrastructure elements of the production environment may include, servers, databases, work stations and each of these may directed to physical and/or virtual processing machines.

It is possible to discover this information manually, such as by providing a series of questions to be answered by an administrative user. However this approach can be tedious, slow to implement, and is prone to errors.

Of particular interest is to discover detailed aspects of the operating systems (OS) in use in the production environment. It would be ideal, for example, to discover details of the particular UNIX-compatible operating systems that are deployed, and to do so automatically, securely, remotely, and without the use of agents.

Certain administrative UNIX commands are known to produce information of interest, such as processor configuration and installed package information. However the output from these commands is text-heavy, complex, and diverse. Furthermore, the output from a given command may differ depending upon the specific variant of UNIX installed (i.e., Linux, Solaris, BSD, etc.). This makes it difficult to design a generic solution that will work for all UNIX distributions.

SUMMARY OF AN EMBODIMENT

In general, the present disclosure is directed to a tool for automating the discovery of configuration information in connection with provisioning a recovery system, and in particular, automating the discovery of UNIX configuration information. In one implementation, a Configuration Management System (or CMS) assists human operators with collecting configuration data. One of the functions performed by the CMS is to periodically obtain configuration information concerning the customer's production environment which may include a number of data processing infrastructure elements such as, but not limited to physical machines, virtual machines, storage sub-systems, database servers, and other data processors which are running a UNIX-based or UNIX-like operating system. The infrastructure elements thus have a live, running UNIX configuration state that is exposed to and can be queried automatically via executable files and associated information distributed by the CMS.

The CMS implements the automatic query using one or more commands that are expected to produce configuration information as output. Each command has an associated parsing logic specification as well. The command/parsing logic pairs can be stored in a convenient machine and human readable format such as an .XML file. A single .XML file may contain all of the commands/parsing logic pairs necessary to characterize a particular UNIX distribution. Thus, there would typically be an .XML file created for each UNIX distribution and/or version that is expected to be found in the production environment.

The CMS further implements the automatic query by forwarding an executable file to the production environment.

In operation, once the type of UNIX operating system is identified, the corresponding executable and .XML files are located and forwarded to run in the production environment such as via a secure shell (SSH) connection. The executable reads a first command from the .XML file and executes the command, such as via a UNIX command, on the associated physical or virtual machine in the production environment.

The output from the command is captured by the executable. The associated parsing logic is applied to the command output by the executable to determine configuration information of interest. The process then repeats for each command/parsing logic pair in the .XML file.

The executable first stores the resulting configuration information locally in the production environment, such as in a local file or database. This stored information can next be made available for review by an administrative user responsible for the production environment. Once that user is satisfied with the information to be shared with the replication service provider, the information can be forwarded to the CMS.

The CMS can then store this configuration information in a configuration survey database for later retrieval and later use in configuring a recovery environment to be brought on line in the event of a failure of the customer's production environment. The automatically discovered information may be augmented with manually entered information.

In one implementation, the UNIX executable may invoke further functions in the production environment. For example, host name(s) and login credential(s) for one or more data processors in the customer's production environment are collected to enable access to the physical and/or virtual machines to be queried.

For example, the executable code may use the host name and login credentials to automatically connect to each machine in the production environment via a secure shell (SSH), and collect configuration information such as manufacturer, model, physical memory, UNIX operating system (OS) type and OS version installed applications and so forth that are necessary to replicate the machine. The code may then locate the correct .XML file to use for that particular UNIX installation, and then process the .XML file as described above to obtain further configuration information about the particular UNIX operating system installation.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments follows.

Figure 1:
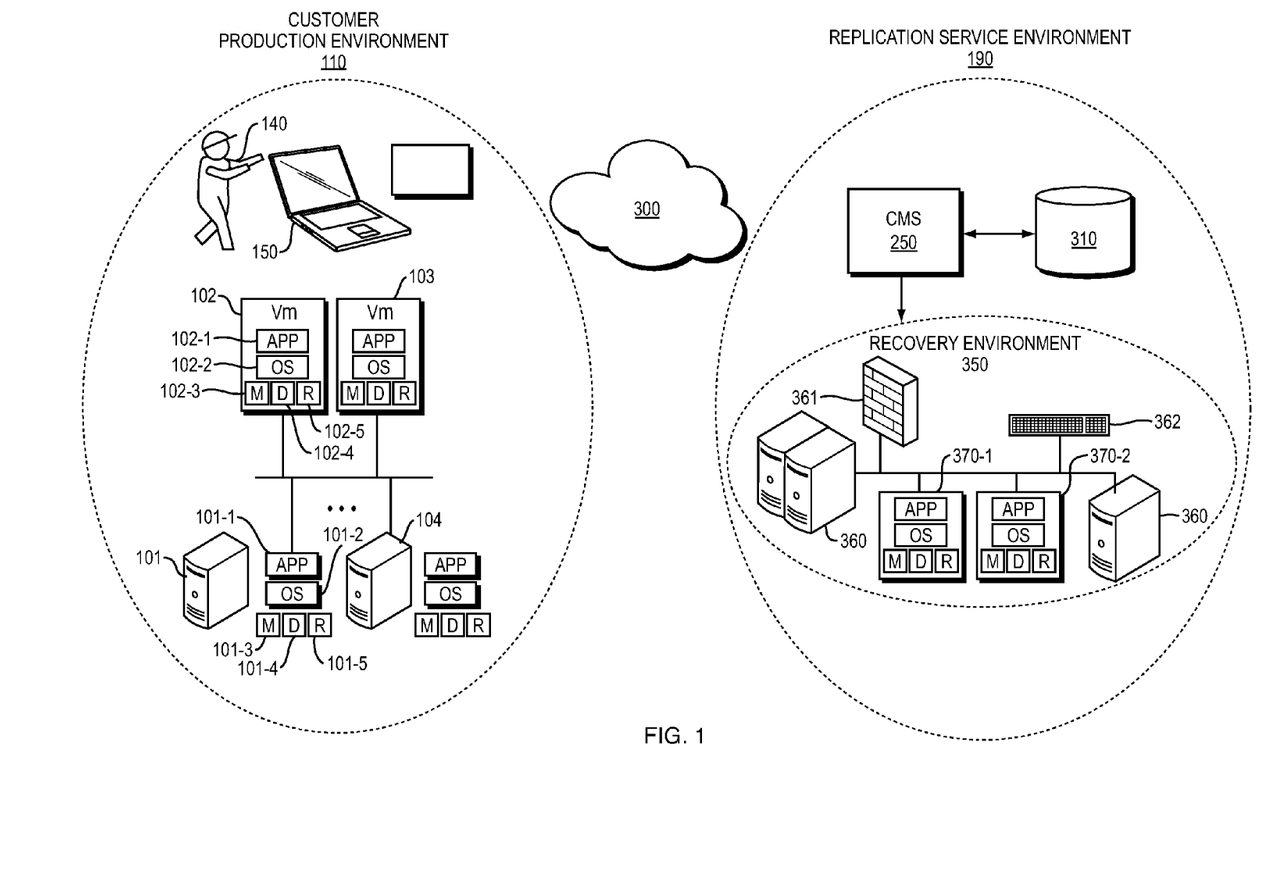
FIG. 1 is a diagram of a replication service environment operating a recover to cloud service for multiple customers, and a specific customer production environment.

FIG. 1 is a high level block diagram of an environment in which apparatus, systems, and methods for discovering respective configuration information for physical and virtual machines that are running a UNIX operating system in a production environment. This operating system configuration information may be automatically discovered in connection with offering a Managed Recovery Program (MRP), Recover to Cloud (R2C) service, or other service.

As shown, a production side environment 110 (that is, the customer's side from the perspective of a replication service provider) includes a number of data processing machines such as servers 101, 102, . . . , 104. The production servers may be physical machines 101 . . . 104 or virtual machines (VMs) 102 . . . 103. An administrator node 150 provides access to an administrator to access a browser-based configuration discovery tool as described below in more detail.

The production servers 101 . . . 104 may implement any sort of data processing function, such as a web server, database server, application server, media server, etc.—the specific end use of the servers is typically not important. An example physical machine 101 is a server that has an application program 101-1, operating system 101-2, memory 101-3, local storage 101-4, and other resources 101-5 such as network connections, etc. An example VM 102 may also include an application 102-1, operating system 102-2, memory 102-3, local data 102-4 and other resources 102-5.

One or more of the production servers 101 . . . 104 may include a replication agent process (not shown in FIG. 1) that performs replication operations. The replication agents detect changes in the production environment 110 and reports them to a replication service environment 190. More specifically, the production servers 101 . . . 104 are connected to a wide area network (WAN) connection 300 such as provided by the Internet, a private network or other network to a replication service environment 190 that provides one or more data centers as a recovery environment 350. The service customer does not really care where or how the recovery environment is implemented, and so from the customer's perspective, is are located at the service provider environment 190 and accessible in the network 300 cloud.

The recovery environment may make extensive use of virtual machines to replicate the physical and virtual machines in the production environment 110. In such a virtualized computing environment with virtual machines operating in a cloud recovery environment 350, multiple computation stacks, including operating system, middleware, and applications, can operate together in a single server or set of servers. The cloud system(s) are therefore virtualized environments where virtual machines can elastically and dynamically scale to match the load or performance demands, where access to the cloud service is through a public network, and where the number and capability of virtual machines can be measured by the cloud provider and made available to the specifications of the customer using the cloud according to Service Level Agreements or other contractual arrangements.

At a time of disaster (ATOD) (or at time of disaster test (ATOT)), one or more configuration files are retrieved from a configuration database 310 by a Configuration Management System (CMS) 250 and are transferred to one or more on-demand active physical machines 360 or active virtual machines 370 in a failover or recovery environment 350 forming part of the replication service environment 190. The environment 350 is also accessible to the customer via the cloud 300, preferably through a secure network connection such as may be provided by firewalls 361 or secure Viritual Local Area Networks (VLANs) 362.

The specific mechanism(s) for replication and disaster recovery are not of particular importance to the present disclosure. It should also be understood that there may be a number of additional data processors and other elements of a commercial replication service such as recovery systems, storage systems, monitoring and management tools that are not shown in detail in FIG. 1, which are not needed to be specified in detail to understand the present embodiments.

In order to determine the attributes of the physical 360 and virtual 370 machines in the failover or recovery environment 350, a survey tool may run on administrative node 150 and automatically discover at least some configuration information for the elements of the production environment 110. The configuration information may include identification of server(s), Operating Systems (OSs), applications, storage, security and network device information for production environment 110. The discovered configuration information is then sent to the CMS 250 and stored in database 310 for use in bringing the recovery environment on line.

In one embodiment, an administrative user 140 uses an administrative node 150 which is typically located within the customer production environment 110. The administrative user invokes a program to run a configuration discovery tool on node 150. This may be provided by a secure application server website, hosted by CMS 250 in the replication service environment 190. The discovery tool then automatically collects configuration information from the machines 101 . . . 104 in the customers production environment 110.

Information collected by the configuration discovery tool is then forwarded back to the CMS 250. As explained above, the CMS 250 includes a storage device for storing this information, preferably taking the form of a configuration database 310. The database 310 stores several different types of information concerning the customer production environment 110 used to create the replication environment 250. Of particular interest here is that the database 310 stores configuration snapshots consisting of live configuration information taken from and relating to the various infrastructure elements in the customer production environment 110.

The CMS 250 may itself be located in the same physical location as the recovery environment 350, elsewhere the premises of the service provider, at the premises of the customer production environment 110, or remotely located and securely accessing through either a private network or the Internet 112.

Figure 2:
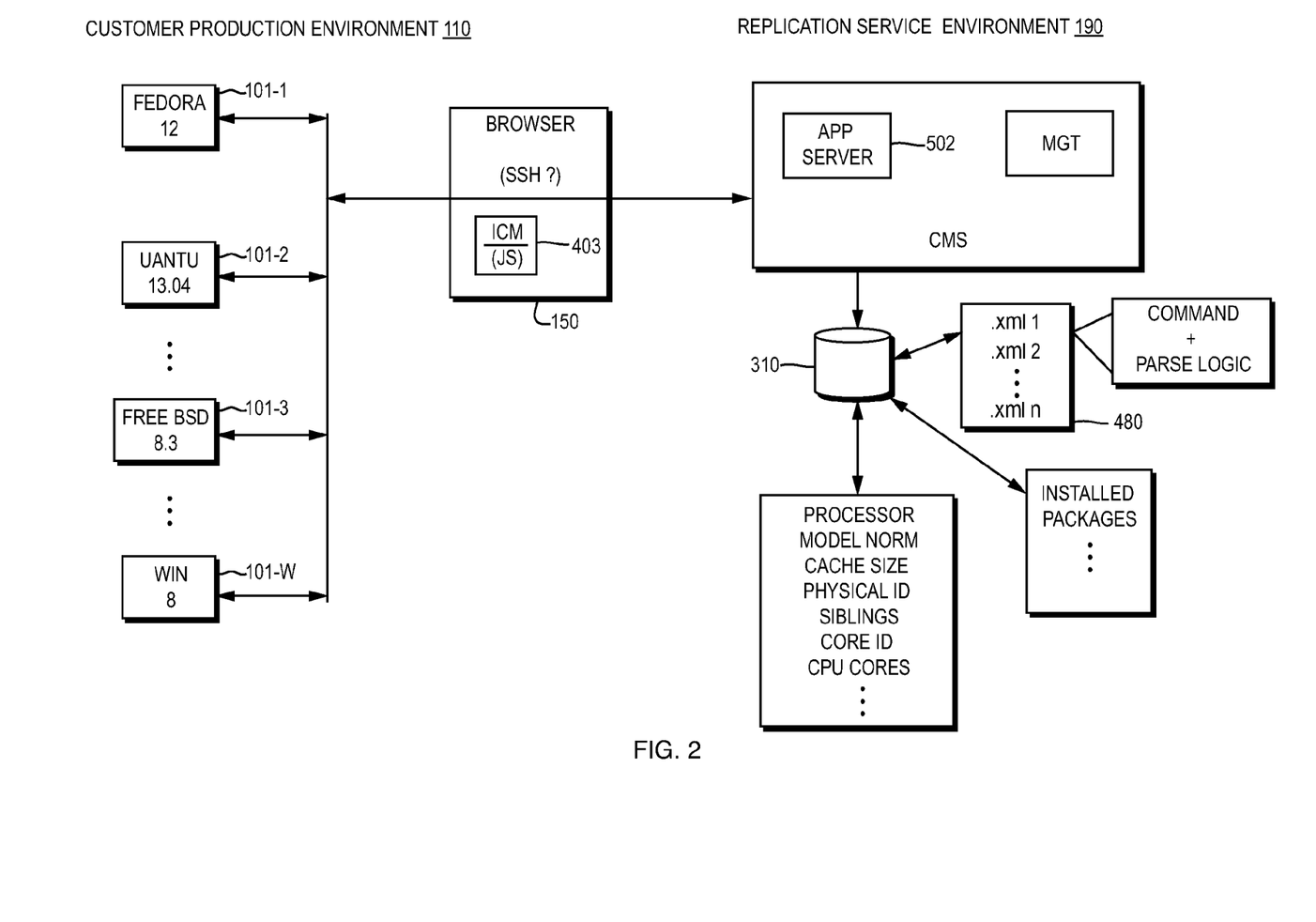
FIG. 2 is a more detailed flow diagram showing the environment of a configuration discovery process according to the teachings herein.

A specific implementation of the discovery tool is shown in more detail in FIG. 2. Here the administrative user 140 at customer production environment 110 makes a request of the CMS 250 in the replication service environment 190 This results in access to an application server 502 that is within the confines of the CMS 250 operated by the replication service provider 190. In one example, the user sends a request to connect to a specific Uniform Resource Locator (URL) for the application server 502 using HyperText Transfer Protocol Secure (https) over the Internet 300.

The administrative user may next be asked to authenticate with the application server 502 using login credentials. Upon successful authentication, the application server 502 then returns several things to the customer production environment 110—one or more executable programs 410 (such as UNIX executable programs) and one or more corresponding data files 412 (such as XML files). over the secure connection. The executable program(s) 410 then run, contacting one or more servers 101-1, 101-2, 101-3, . . . , 101-*w* in the production environment 110, obtains configuration information from them, and stores it in database 310. In this process, the executable program may select and use .XML files 480 that contain commands and parsing logic.

Figure 3:
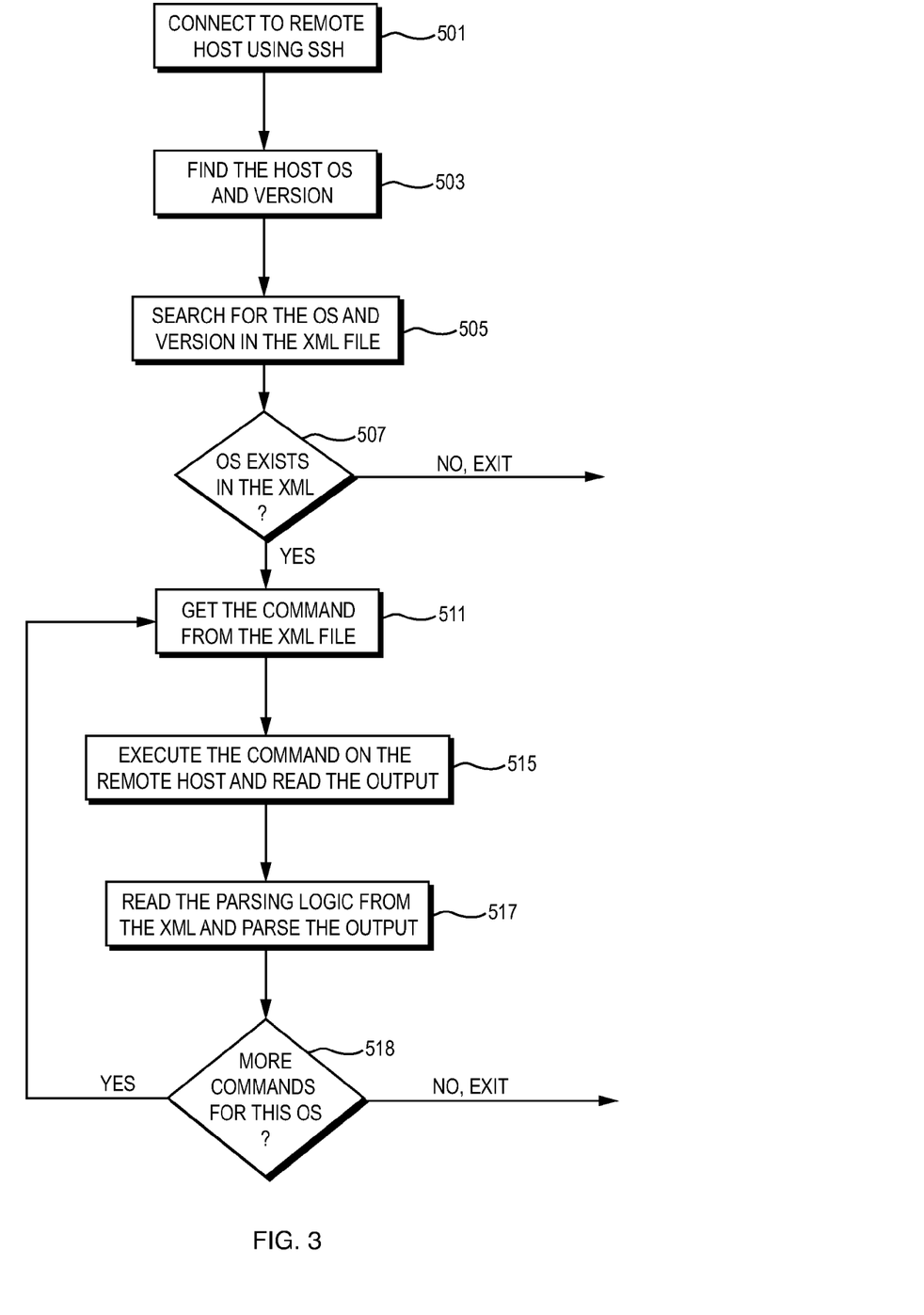
FIG. 3 is an example process flow for an executable file implementing the configuration discovery process.

FIG. 3 illustrates a sequence of steps performed by the executable(s) 410. A first step 501 is to connect to one of the hosts 101 in the production environment using an appropriate access mechanism such as a Secure Shell (SSH) connection. This access may be obtained by the administrative user 140 entering an Internet Protocol (IP) address, user name, and password information for each such remote host machine 101; or this access information may have been previously collected and securely stored in the CMS 250 or database 310 and forwarded with the executable program 410.

In a next step 502, the host operating system (OS) type and version are determined. For example, the executable code 410 may use the host name and login credentials supplied by the user to automatically connect to each machine 101 in the production environment, and retrieve configuration information such as manufacturer, model, physical memory, UNIX operating system (OS) type and OS version installed applications and so forth. In another arrangement, the user may enter the OS and version information manually.

Next, in step 505 the executable code 410 may then determine the correct .XML file to use for that particular UNIX installation. For example, the database 310 may include a number of different .XML files 480, one for each type of UNIX operating system. For example, there may be an .XML file for "Fedora 12", another for "Ubuntu 13.04" and still another for "FreeBSD 8.3".

(It should be understood that there may be other machines that run other non-UNIX operating systems, such as Microsoft Windows 8 (e.g., machine 101-W)—other provisions are provided for accessing configuration information for Windows machines is typically not in this manner, but rather as per the existing patent application referenced above.)

Figure 4:
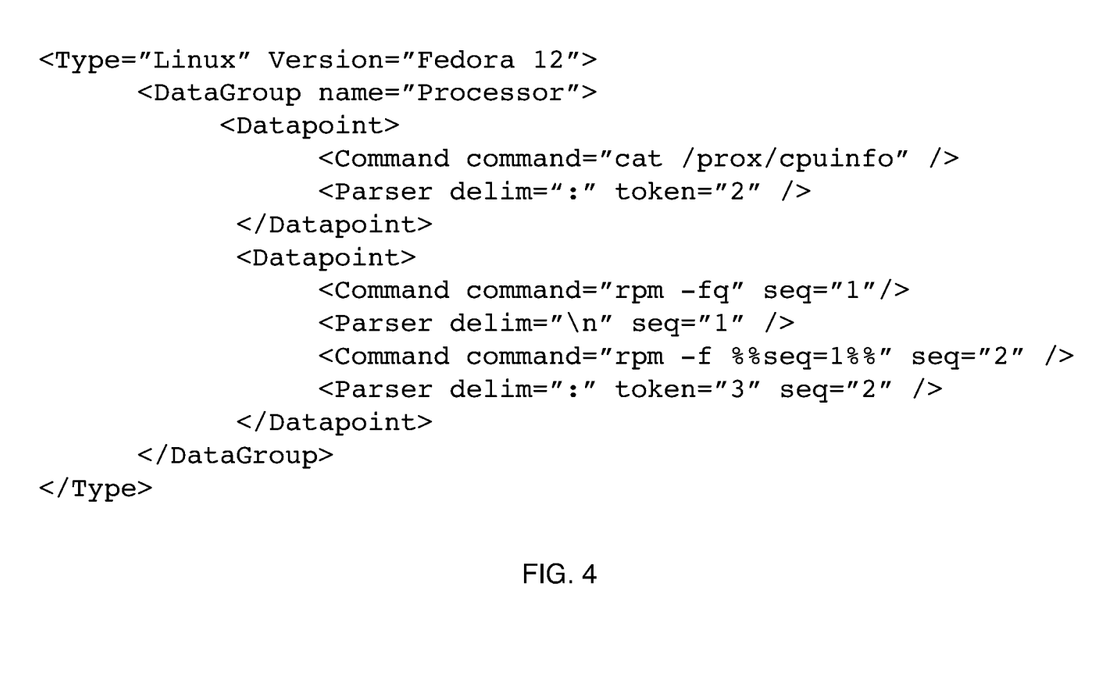
FIG. 4 is a listing for one implementation of an .XML file that has a set of commands and associated parsing logic to obtain the UNIX operating system configuration information.

Each of the .XML files 480 includes one or more commands and an associated parsing logic for each such command. The parsing logic typically reads a new line in the .XML file for each command. An example .XML file for "Fedora 12" is shown in FIG. 4. A first command may be a "cat/prox/cpuinfo" command which is know to return information about the CPU (such as a processor number, model name, cache size, physical identifier, siblings, core identifier and number of CPU cores). A next line in the .XML file contains parsing logic for this command's output (e.g., the ":" character is used as a delimiter and a token length is "2"). The executable can then read this command and parsing logic, submit the command to the machine 101-1, and then extract configuration information from the command output using the parsing logic. The parsed information is then stored in a persistent data store 450 that is local to the customer production environment.

A second command in the .XML file may be a "rpm-fq" command that queries the Fedora 12 installation 101-1 to list installed software packages.

The subsequent line in the .XML file contains logic needed to parse the output of the rpm command. Still other commands, such as additional "rpm" commands can retrieve still further information, such as further information concerning the installed software packages, which will then also be stored in the local database 450.

It is now understood that all of the command/parsing logic pairs to obtain the configuration information needed for machine 101-1 can be stored in a convenient machine and human readable format such as a single .XML file, but that such a file would be created typically for each expected type of UNIX operating system and version.

In any event, returning to FIG. 3, the correct .XML file is located for the particular OS and version in use by host 101-1. If the correct .XML file cannot be found, the process exits is step 507.

Next in step 511, a first command is retrieved from the .XML file. The command is then executed on the remote host 101-1 in step 515, and the parsing logic is read and applied to the command output in step 517 to retrieve the configuration information of interest.

The CMS 250 can store this configuration information obtained from the parsing logic in a configuration survey database 310 for later retrieval and later use in configuring a recovery environment to be brought on line in the event of a failure of the customer's production environment. This automatically discovered information may later be augmented in the database 450 with manually entered information. In a final step 518, the .XML file is checked for additional commands, and the process loops back to step 511 until all commands associated with the particular OS are executed.

After the configuration information is collected by the executable 410 and stored in the local database 450, the configuration information can next be made available for review by an administrative user 140 responsible for the customer production environment 110. Once that user 140 is satisfied with the information to be shared with the replication service provider 190, the information can be forwarded to the CMS 250 and stored in the database 310 there. The automatically discovered information may be augmented with manually entered information.

The CMS 250 can then use this configuration information as stored in configuration survey database 310 for later retrieval and later use in configuring a recovery environment 350 to be brought on line in the event of a failure of the customer's production environment 110.

It should be understood that the example embodiments described above may be implemented in many different ways. In some instances, the various "data processors" described herein may each be implemented by a physical or virtual general purpose computer having a central processor, memory, disk or other mass storage, communication interface(s), input/output (I/O) device(s), and other peripherals. The general purpose computer is transformed into the processors and executes the processes described above, for example, by loading software instructions into the processor, and then causing execution of the instructions to carry out the functions described. As is known in the art, such a computer may contain a system bus, where a bus is a set of hardware lines used for data transfer among the components of a computer or processing system. The bus or busses are essentially shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically I/O device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

The computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that can be rapidly provisioned and released with minimal management effort or service provider interaction. Such cloud computing deployments are relevant and typically preferred as they allow multiple users to access computing resources as part of a shared marketplace. By aggregating demand from multiple users in central locations, cloud computing environments can be built in data centers that use the best and newest technology, located in the sustainable and/or centralized locations and designed to achieve the greatest per-unit efficiency possible.

In certain embodiments, the procedures, devices, and processes described herein are a computer program product, including a computer readable medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); magnetic disk storage media; optical storage media; flash memory devices; and others.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

Thus, while this invention has been particularly shown and described with references to example embodiments thereof, it will be understood by those skilled in the art that various changes in form and details may be made therein without departing from the scope of the invention as encompassed by the appended claims.

While this invention has been particularly shown and described with references to example embodiments thereof, it will be understood by those skilled in the art that various changes in form and details may be made therein without departing from the scope of the invention encompassed by the appended claims.

What is claimed is:

1. A method implemented on a node including a memory coupled with a hardware processor for automated configuration detection for host machines in a customer production environment that are to be replicated in recovery host machines in a replication service environment comprising:
   sending a request from a secure browser executing on the node within the customer production environment to an application server located within the replication service environment, the request for access to an executable survey program stored by the application server, wherein the customer production environment is remotely located from the replication service environment and connected via a private network connection;
   receiving, by the secure browser from the application server located in the replication service environment, the executable survey program;
   running the executable survey program from within the secure browser, the executable survey program further, for each respective host machines within the customer production environment:
   (a) obtaining access information for the respective host machines including host names and login credentials, wherein the host names and the login credentials are used to automatically connect to each of the respective host machines in the customer production environment via secure shell (SSH);
   (b) using the access information for each of the respective host machines to invoke an instrumented component interface for accessing the respective host machines to obtain installed operating system type and version information for the respective host machines;
   (c) using the operating system type and version information to request access to an operating system specific file from the application server, the operating system specific file containing an operating system specific configuration query commands and operating system specific parsing logics associated with the operating system type and version for the respective host machines, wherein each of the operating system specific configuration query commands has associated operating system specific parsing logics, and wherein requesting access to the operating system specific file from the application server comprises accessing a database to select the operating system specific file from one of several files, each operating system specific file associated with a specific UNIX-compatible operating system type and UNIX-compatible operating system version;
   (d) sending the operating system specific configuration query commands to the respective host machines;
   (e) capturing output of the operating system specific configuration query commands from the respective host machines;
   (f) using the associated operating system specific parsing logics to extract further host configuration information of interest from the output of the operating system specific configuration query commands;
   (g) storing the further host configuration information; and
   (h) using the further host configuration information extracted by the operating system specific parsing logics for configuring the respective recovery host machines in the replication service environment.

2. The method of claim 1, wherein an administrative user of the replication service environment uses the secure browser program from within the customer production environment to send the request to the application server.

3. The method of claim 2, wherein the application server further authenticates the administrative user before providing access to the executable survey program.

4. The method of claim 1, wherein the executable survey program is a JavaScript program.

5. The method of claim 1, wherein at least one of the respective hosts machines within the customer production environment implements a UNIX compatible operating system selected from a group consisting of LINUX, Solaris, BSD, Ubuntu and Fedora.

6. The method of claim 1, wherein the operating system specific file is an XML file.

7. The method of claim 1 wherein the further host configuration information comprises a manufacturer, model, and physical memory of the respective host machines, as well as the installed operating system type and installed operating system version.

8. The method of claim 1 wherein the executable survey program further obtains access to the one or more host machines using a secure shell connection to send the host names and login credentials to the respective host machines in the customer production environment.

9. The method of claim 8 wherein a connection from the browser to the respective host machines is a secure shell connection.

10. The method of claim 1 wherein the operating system specific parsing logics include delimiter and token length.

11. An apparatus for configuration detection of a customer production environment containing host machines that are replicated to recovery hosts machines in a replication service environment comprising:
   an application server, located within the replication service environment;
   a node including a memory coupled with a hardware processor, located within the customer production environment, for executing a secure browser program, when executed on the hardware processor, to:
   connect to the application server located within the replication service environment, and request access to an executable survey program stored by the application server, wherein the customer production environment is remotely located from the replication service environment and connected via a private network connection;
   receive, by the secure browser from the application server located in the replication service environment, the executable survey program;
   run the executable survey program from within the secure browser, the executable survey program further, for each respective host machines within the customer production environment:
   (a) obtain access information for the respective host machines including host names and login credentials, wherein the host names and the login credentials are used to automatically connect to each of the respective host machines in the customer production environment via secure shell (SSH);
   (b) use the access information for each of the respective host machines to invoke an instrumented component interface for accessing the respective host machines to obtain installed operating system type and version information for the respective host machines;
   (c) using the operating system type and version information to request access to an operating system specific file stored by the application server, the operating system specific file containing an operating system specific configuration query commands and operating system specific parsing logics associated with the operating system type and version for the respective host machines, wherein each of the operating system specific configuration query commands has associated operating system specific parsing logics, and wherein requesting access to the operating system specific file from the application server comprises accessing a database to select the operating system specific file from one of several files, each operating system specific file associated with a specific UNIX-compatible operating system type and UNIX-compatible operating system version;

(d) send the operating system specific configuration query commands to the respective host machines;

(e) capture output of the operating system specific configuration query commands from the respective host machines;

(f) use the associated operating system specific parsing logics to extract additional host configuration information of interest from the output of the operating system specific configuration query commands;

(g) store the additional host configuration information; and (h) use the additional host configuration information extracted by the operating system specific parsing logics to configure the respective recovery host machines in the replication service environment.

12. The apparatus of claim 11, wherein the secure browser program further accepts input from an administrative user of the replication service environment from within the customer production environment.

13. The apparatus of claim 12, wherein the application server further authenticates the administrative user before providing access to the executable survey program.

14. The apparatus of claim 11, wherein the executable survey program is a JavaScript program.

15. The apparatus of claim 11, wherein the host configuration information is forwarded to the replication service environment as an XML file.

16. The apparatus of claim 11, further comprising:
a configuration database to store the additional host configuration information extracted by the associated operating system specific parsing logics, and also store the operating system specific file.

17. A programmable computer product comprising a non-transitory computer readable storage medium having a computer readable program stored therein, wherein the computer readable program, when executed by a processor on a computer device, causes automated configuration detection of host machines in a customer production environment that are replicated to recovery host machines in a replication service environment, the programmable computer product comprising:

sending a request from a secure browser executing on a node within the customer production environment to an application server located within the replication service environment, the request for access to an executable survey program stored by the application server, wherein the customer production environment is remotely located from the replication service environment and connected via a private network connection;

receiving, by the secure browser from the application server located in the replication service environment, the executable survey program;

running the executable survey program from within the secure browser, the executable survey program further, for each respective host machines in the customer production environment:

(a) obtaining access information for the respective host machines including host names and login credentials, wherein the host names and the login credentials are used to automatically connect to each of the respective host machines in the customer production environment via secure shell (SSH);

(b) using the access information for each of the respective host machines to invoke an instrumented component interface to connect to the respective host machines to obtain installed operating system type and version information for the respective host machines;

(c) using the operating system type and version information to request access to an operating system specific file from the application server, the operating system specific file containing an operating system specific configuration query commands and operating system specific parsing logics associated with the operating system type and version for the respective host machines, wherein each of the operating system specific configuration query commands has associated operating system specific parsing logics, and wherein requesting access to the operating system specific file from the application server comprises accessing a database to select the operating system specific file from one of several files, each operating system specific file associated with a specific UNIX-compatible operating system type and UNIX-compatible operating system version;

(d) sending the operating system specific configuration query commands to the respective host machines;

(e) capturing output of the operating system specific configuration query commands from the respective host machines; and (f) using the associated operating system specific parsing logics to extract additional host configuration information of interest from the output of the operating system specific configuration query commands;

(g) storing the additional host configuration information; and (h) using the additional host configuration information extracted by the operating system specific parsing logics for configuring the respective recovery host machines in the replication service environment.

* * * * *

UNITED STATES PATENT AND TRADEMARK OFFICE
CERTIFICATE OF CORRECTION

PATENT NO. : 9,479,396 B2  
APPLICATION NO. : 13/906983  
DATED : October 25, 2016  
INVENTOR(S) : Amol P. Gokhale Page 1 of 1

It is certified that error appears in the above-identified patent and that said Letters Patent is hereby corrected as shown below:

In the Claims

Claim 1, Column 9, Line 7 reads:  
sending a request from a secure browser executing on the  
Should read:  
sending a request from a secure browser executing on a Claim 5, Column 10, Line 9 reads:  
respective hosts machines within the customer production  
Should read:  
respective host machines within the customer production Claim 11, Column 10, Line 32 reads:  
replicated to recovery hosts machines in a replication service  
Should read:  
replicated to recovery host machines in a replication service Signed and Sealed this  
Eleventh Day of July, 2017

Joseph Matal  
*Performing the Functions and Duties of the*  
*Under Secretary of Commerce for Intellectual Property and*  
*Director of the United States Patent and Trademark Office*